United States Patent Office 3,299,084
Patented Jan. 17, 1967

3,299,084
BENZOTHIAZOLSULPHONYL SUBSTITUTED REACTIVE ACID ANTHRAQUINONE DYESTUFFS
André Albert Paul Simonnet and Jean André Paul Kienzle, both of Creil, France, assignors to Etablissements Kuhlmann, Paris, France
No Drawing. Filed Sept. 21, 1965, Ser. No. 489,041
Claims priority, application France, Sept. 24, 1964, 989,178
1 Claim. (Cl. 260—303)

The present invention relates to new dyestuffs of the general formula:

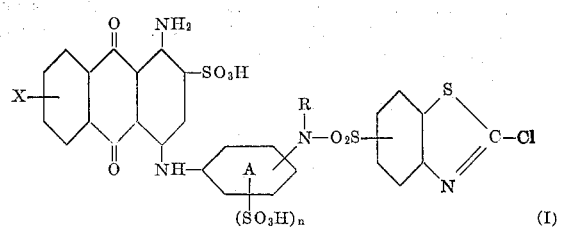

in which R represents an alkyl group, preferably an alkyl group containing 1 to 5 carbon atoms, X represents a hydrogen atom or a sulphonic group, $n$ represents 1 or 2, and the nucleus A may be further substituted by halogen atoms or alkyl or alkoxy groups.

By comparison with those reactive dyestuffs of general Formula I in which R represents a hydrogen atom the dyestuffs of this invention have the advantage of not altering in shade in a strongly alkaline medium. The dyestuffs of the previously known art in fact give, in such a medium, a salt of the type:

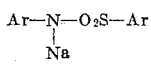

It is then necessary, after dyeing and washing with soap, to subject the fibers to an acid treatment in order to obtain the final blue shade. The dyestuffs of this invention enable this disadvantage to be avoided and moreover they are faster to washing in the presence of chlorine than the dyestuffs of the prior art.

The dyestuffs of the invention may be prepared for example by the action of 2 - chloro - benzothiazolesulphochloride on compounds of the general formula:

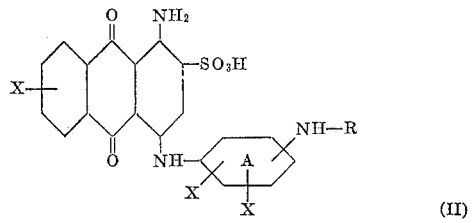

in which X and R have the same significance as above. When the resulting condensation product is a mono- or di-sulphonated derivative it can, if desired, be subjected to sulphonation so as to introduce 1 or 2 additional sulphonic groups.

The intermediate products of Formula II may be prepared, for example, by condensing 1 - amino - 4 - bromoanthraquinone - sulphonic acids with $N_1$ - alkyl $N_1$-acyl phenylenediamines, then eliminating the acyl group by hydrolysis, followed possibly by sulphonation. Suitable acyl groups, for example, include acetyl, benzenesulphonyl and p-toluenesulphonyl groups. The intermediate products of Formula II may also be prepared by condensing the same anthraquinonesulphonic acids with N - monoalkyl-diaminobenzenesulphonic acids.

In the dyestuffs of Formula I the chlorine atom is reactive and capable of causing condensation between the dyestuffs and the fibres containing OH or NH groups. This reaction may be effected by known processes, preferably in the presence of acid-binding agents.

The following examples, in which the parts indicated are parts by weight, illustrate but do not limit the invention.

EXAMPLE 1

4.5 parts of 1 - amino - 3' - methylamino - 4 - phenylamino - anthraquinone - 2 - sulphonic acid are dissolved in 100 parts of a 1% aqueous solution of sodium carbonate. The mixture is heated to 30–35° C. and a solution of 3.5 parts of 2 - chloro - benzothiazole - sulphochloride in 15 parts of acetone is added gradually in a period of 2 hours, with stirring. Simultaneously a 10% solution of sodium carbonate is added in order to keep the pH between 7 and 7.5. At the end of 24 hours, the reaction is finished and the condensation product precipitates. Its precipitation is completed by the addition of salt, and it is filtered off, drained and dried under vacuum at 50° C. The product obtained, being very sparingly soluble in water, is sulphonated as follows:

10 parts of the product are dissolved in 100 parts of 100% sulphuric acid. 20 parts of 20% oleum are added and the mixture is allowed to react at ordinary room temperature until a sample is readily soluble in water (3 to 4 hours at 15° C.). The product is poured on ice and the dyestuff is precipitated by the addition of sodium chloride, filtered off, washed with a 20% solution of sodium chloride, drained and dried under vacuum at 50° C. The reactive dyestuff obtained is a blue powder which is very soluble in water.

The initial 1 - amino - 3' - methylamino - 4 - phenylamino - anthraquinone - 2 - sulphonic acid is prepared by condensing the sodium salt of 1 - amino - 4 - bromoanthraquinone - 2 - sulphonic acid with N - methyl N-acetyl m-phenylenediamine, then deacetylating by heating with a 10% solution of sodium hydroxide, followed by acidifying with hydrochloric acid.

EXAMPLE 2

6 parts of the disodium salt of 1 - amino - 4' - methylamino - 4 - phenylamino - anthraquinone - 2,3' - disulphonic acid are dissolved in 150 parts of water. The solution is heated to 30–35° C. and a solution of 3.5 parts of 2 - chloro - benzothiazole - sulphochloride in 15 parts of acetone is added with stirring. Simultaneously a solution of 10% sodium carbonate is added in order to keep the pH at 7 to 7.5. At the end of about 24 hours the reactive dyestuff is precipitated from its solution by the addition of sodium chloride, and is filtered off, drained and dried under vacuum at 50° C. The reactive dyestuff obtained is a blue powder which is soluble in water.

The initial sodium disulphonate is prepared by condensing the sodium salt of 1 - amino - 4 - bromo - anthraquinone - 2 - sulphonic acid with the sodium salt of $N_4$-methyl - 1,4 - diamino - benzene - 3 - sulphonic acid at 65–70° C. in an aqueous medium and in the presence of sodium carbonate, acid sodium carbonate and cuprous chloride.

EXAMPLE 3

If the sodium salt of 1 - amino - 3' - methylamino-4 - phenylamino - anthraquinone - 2 - sulphonic acid in Example 1 is replaced by the sodium salt of 1 - amino - 4'-methylamino - 4 - phenylamino - anthraquinone - 2 - sulphonic acid, there is obtained after sulphonation of the condensation product a blue dyestuff which is more soluble than that of Example 2.

EXAMPLE 4

If the 6 parts of the disodium salt of 1 - amino - 4'-methylamino - 4 - phenylamino - anthraquinone - 2,3'- disulphonic acid in Example 2 are replaced by 7.1 parts of the trisodium salt of 1 - amino - 4' - methylamino - 4-phenylamino - anthraquinone - 2,5,3' - trisulphonic acid, a reactive dyestuff is obtained, the shade of which is similar to that of the dyestuff of Example 2, but its solubility in water is much better.

EXAMPLE 5

On operating as in Example 2, but using 6.5 parts of the disodium salt of 1 - amino - 2' - methyl - 3' - methylamino - 4 - phenylamino - anthraquinone - 2,5' - disulphonic acid, a blue reactive acid dyestuff is also obtained.

The initial intermediate product used in this example is prepared in the following way: the sodium salt of 1-amino - 4 - bromo - anthraquinone - 2 - sulphonic acid is condensed with the sodium salt of 1 - methyl - 2,6-diamino - benzene - 4 - sulphonic acid in aqueous medium, in the presence of sodium carbonate and cuprous chloride. The product obtained is reacted with p-toluenesulphochloride, then the sulphonamide is methylated by methyl sulphate in the presence of caustic soda, and the N-methylsulphonamide is saponified by heating at 100° C. in 80% sulphuric acid.

EXAMPLE 6

2 parts of one of the dyestuffs of Examples 1 to 5 and 2 parts of sodium carbonate are dissolved in 100 parts of water. A cotton fabric is foularded in this solution and squeezed out so that the amount of solution retained by the fabric is equal to 75% of the fabric weight. The fabric thus impregnated is dried, heated to 140–150° C. for about 5 minutes, then rinsed, washed with soap at the boil for a quarter of an hour, again rinsed, and dried. Deep blue shades are thus obtained, which are fast to light and very fast to washing at the boil. When subjected to the test of washing in the presence of chlorine they are scarcely affected, while the colourations obtained with the corresponding non-methylated dyestuffs turn gray after washing in the presence of chlorine. This test is carried out as follows: 1 part of the cotton fabric is maintained for 45 minutes in 50 parts of an aqueous solution at 83° C. containing, per litre, 5 g. of soap, 2 g. of sodium carbonate and 0.1 g. of active chlorine (6.3 cc. of Javel water with 16 g./l. of active chlorine). The fabric is rinsed, treated for 1 minute at 27° C. with dilute acetic acid, dried and ironed with a hot iron and the shades before and after the test are compared.

EXAMPLE 7

A printing paste is prepared comprising the following components:

20 parts of the dyestuff of Example 1
100 parts of urea
20 parts of sodium carbonate
500 parts of a thickener based on sodium alginate and
360 parts of water A cotton fabric is printed with this paste, dried, steamed for 5 to 10 minutes at 100–102° C., then rinsed and washed with soap at the boil. A blue colouration is obtained which is very fast to washing, especially to washing in the presence of chlorine.

We claim:
Dyestuffs of the formula:

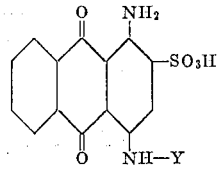

in which Y represents a member selected from the group consisting of N - (2' - chloro - benzothiazolsulphonyl) N - methyl 4 - amino - 2 - sulpho - phenyl and N - (2'-chlorobenzothiazolsulphonyl) N-methyl 3-amino-4-sulfophenyl).

References Cited by the Examiner
FOREIGN PATENTS
1,332,772  6/1963  France.

NORMAN G. TORCHIN, *Primary Examiner.*

J. TRAVIS BROWN, *Examiner.*

J. HERBERT, *Assistant Examiner.*